US012749642B2

(12) United States Patent
Reed et al.

(10) Patent No.: US 12,749,642 B2
(45) Date of Patent: Sep. 29, 2026

(54) PATTERNED X-RAY EMITTING TARGET

(71) Applicant: NOVA MEASURING INSTRUMENTS INC., Fremont, CA (US)

(72) Inventors: David A. Reed, Belmont, CA (US); Bruce H. Newcome, Sunnyvale, CA (US); Bruno W. Schueler, San Jose, CA (US)

(73) Assignee: NOVA MEASURING iNSTRUMENTS iNC., Fremont, CA (US)

( * ) Notice: Subject to any disclaimer, the term of this patent is extended or adjusted under 35 U.S.C. 154(b) by 0 days.

(21) Appl. No.: 18/675,096

(22) Filed: May 27, 2024

(65) Prior Publication Data

US 2025/0006451 A1 Jan. 2, 2025

Related U.S. Application Data

(63) Continuation of application No. 17/754,998, filed as application No. PCT/IB2020/059926 on Oct. 22, 2020, now Pat. No. 11,996,259.

(51) Int. Cl.

| | |
|---|---|
| ***H01J 35/12*** | (2006.01) |
| ***G01N 23/20008*** | (2018.01) |

(Continued)

(52) U.S. Cl.

CPC ........ *H01J 35/12* (2013.01); *G01N 23/20008* (2013.01); *G01N 23/207* (2013.01); *G01N 23/2208* (2013.01); *G01N 23/223* (2013.01); *G01N 23/2273* (2013.01); *H01J 35/24* (2013.01); *G01N 2223/045* (2013.01); *G01N 2223/052* (2013.01); *G01N 2223/056* (2013.01); *G01N 2223/072* (2013.01); *G01N 2223/076* (2013.01); *G01N 2223/085* (2013.01); *G01N 2223/1016* (2013.01); *G01N 2223/204* (2013.01); *G01N 2223/611* (2013.01);

(Continued)

(58) Field of Classification Search

None

See application file for complete search history.

(56) References Cited

U.S. PATENT DOCUMENTS 1,953,813 A * 4/1934 Matsushima .......... H01J 35/112 313/355
6,377,660 B1 4/2002 Ukita et al.

(Continued)

FOREIGN PATENT DOCUMENTS

CN 102792782 A 11/2012
EP 1727185 A1 11/2006

(Continued)

OTHER PUBLICATIONS

Machine translation of WO 2011/122020 A1 (Year: 2011).*

*Primary Examiner* — Thomas R Artman
(74) *Attorney, Agent, or Firm* — Reches Patents

(57) ABSTRACT

The present invention is intended to provide improved patterned X-ray emitting targets as well as X-ray sources that include patterned X-ray emitting targets as well as X-ray reflectance scatterometry (XRS) systems and also including X-ray photoelectron spectroscopy (XPS) systems and X-ray fluorescence (XRF) systems which employ such X-ray emitting targets.

15 Claims, 8 Drawing Sheets

(51) Int. Cl.

*G01N 23/207* (2018.01)
*G01N 23/2208* (2018.01)
*G01N 23/223* (2006.01)
*G01N 23/2273* (2018.01)
*H01J 35/24* (2006.01)

(52) U.S. Cl.

CPC ... *H01J 2235/081* (2013.01); *H01J 2235/084* (2013.01); *H01J 2235/086* (2013.01); *H01J 2235/1204* (2013.01); *H01J 2235/1291* (2013.01); *H01J 2235/1295* (2013.01)

(56) References Cited

U.S. PATENT DOCUMENTS 6,771,735 B2 * 8/2004 Janik .................... G01B 15/02 378/70
7,023,950 B1 4/2006 Annis
7,248,672 B2 * 7/2007 Durst .................... H01J 35/112 378/197
7,359,487 B1 4/2008 Newcome
7,436,931 B2 10/2008 Harding
7,873,146 B2 1/2011 Okunuki et al.
7,903,786 B2 * 3/2011 Zhong .................. H01J 35/105 378/129
8,416,920 B2 * 4/2013 Okumura ................ H01J 35/12 378/143
8,666,024 B2 3/2014 Okunuki et al.
9,036,786 B2 5/2015 Parsons et al.
9,053,898 B2 * 6/2015 Kraft .................... H01J 35/106
9,208,987 B2 12/2015 Miyazaki et al.
9,638,646 B2 * 5/2017 Morton ................ G01N 23/087
9,934,930 B2 4/2018 Parker et al.
10,269,528 B2 4/2019 Yun et al.
10,366,860 B2 7/2019 Parker et al.
10,416,099 B2 9/2019 Yun et al.
10,453,643 B2 10/2019 Peterson et al.
10,485,492 B2 11/2019 Koehler et al.
10,520,454 B2 12/2019 Strelec et al.
10,656,105 B2 5/2020 Yun et al.
10,658,145 B2 5/2020 Yun et al.
10,991,538 B2 4/2021 Yun et al.
11,056,308 B2 7/2021 Yun et al.
11,094,497 B2 * 8/2021 Liang .................... H01J 35/12
11,844,641 B2 12/2023 Fuller
11,996,259 B2 * 5/2024 Reed .................... G01N 23/207
12,278,080 B2 * 4/2025 Yun ........................ H01J 35/18
12,512,289 B2 * 12/2025 Klausz .................... H01J 35/10
2003/0086533 A1 * 5/2003 Janik ...................... G01B 15/02 378/138
2005/0100126 A1 5/2005 Mistretta et al.
2006/0115051 A1 6/2006 Harding
2006/0239408 A1 * 10/2006 Durst .................... H01J 35/112 378/121
2007/0153979 A1 7/2007 Baumann et al.
2009/0316860 A1 12/2009 Okunuki et al.
2010/0020934 A1 * 1/2010 Morton .................. H01J 35/112 378/124
2010/0046717 A1 * 2/2010 Zhong .................. H01J 35/105 378/143
2011/0058655 A1 * 3/2011 Okumura ................ H01J 35/12 427/532
2011/0235781 A1 9/2011 Aoki et al.
2012/0318987 A1 12/2012 Miyazaki et al.
2013/0108024 A1 5/2013 Parsons et al.
2013/0202082 A1 8/2013 Okunuki et al.
2014/0355742 A1 * 12/2014 Kraft .................... H01J 35/106 378/143
2015/0092924 A1 4/2015 Yun et al.
2015/0303021 A1 10/2015 Parker et al.
2016/0189909 A1 * 6/2016 Yamanishi ............ H01J 35/112 378/138
2016/0351370 A1 12/2016 Yun et al.
2017/0287673 A1 10/2017 Peterson et al.
2017/0319149 A1 11/2017 Koehler et al.
2018/0190467 A1 7/2018 Parker et al.
2018/0247786 A1 * 8/2018 Liang ...................... H01J 35/12
2019/0011379 A1 1/2019 Yun et al.
2020/0035440 A1 1/2020 Yun et al.
2020/0041428 A1 2/2020 Yun et al.
2020/0098537 A1 3/2020 Yun et al.
2020/0350138 A1 11/2020 Yun et al.
2020/0365361 A1 11/2020 Yun et al.
2021/0350997 A1 * 11/2021 Liang ...................... H01J 35/12
2022/0328277 A1 10/2022 Fuller
2022/0390395 A1 12/2022 Reed et al.
2023/0218247 A1 * 7/2023 Yun ........................ H01J 35/14 378/119
2025/0006451 A1 * 1/2025 Reed .................... G01N 23/223
2025/0087439 A1 * 3/2025 Klausz .................... H01J 35/10

FOREIGN PATENT DOCUMENTS

JP 2017022054 A 1/2017
WO 2011122020 A1 10/2011

* cited by examiner

PATTERNED X-RAY EMITTING TARGET

REFERENCE TO RELATED PATENT AND PATENT APPLICATION

Reference is hereby made to U.S. Pat. No. 9,588,066 and U.S. Published Patent Application No. 2017/0160081, both of which are owned by the assignee of the present invention, the disclosures of which are hereby incorporated by reference.

FIELD OF THE INVENTION

The present invention relates to patterned X-ray emitting targets and to X-ray sources including patterned X-ray emitting targets as well as to X-ray reflectance scatterometry (XRS) systems, X-ray photoelectron spectroscopy (XPS) systems and X-ray fluorescence (XRF) systems which employ such X-ray emitting targets.

BACKGROUND OF THE INVENTION

Various types of patterned X-ray emitting targets and X-ray sources including patterned X-ray emitting targets as well as X-ray reflectance scatterometry (XRS) systems, X-ray photoelectron spectroscopy (XPS) systems and X-ray fluorescence (XRF) systems which employ such X-ray emitting targets are known.

SUMMARY OF THE INVENTION

The present invention seeks to provide improved patterned X-ray emitting targets and X-ray sources including patterned X-ray emitting targets as well as X-ray reflectance scatterometry (XRS) systems, X-ray photoelectron spectroscopy (XPS) systems and X-ray fluorescence (XRF) systems which employ such X-ray emitting targets.

BRIEF DESCRIPTION OF THE DRAWINGS

The present invention will be understood and appreciated more fully from the following detailed description, taken in conjunction with the drawings in which.

DESCRIPTION OF PREFERRED EMBODIMENTS

Figure 1:
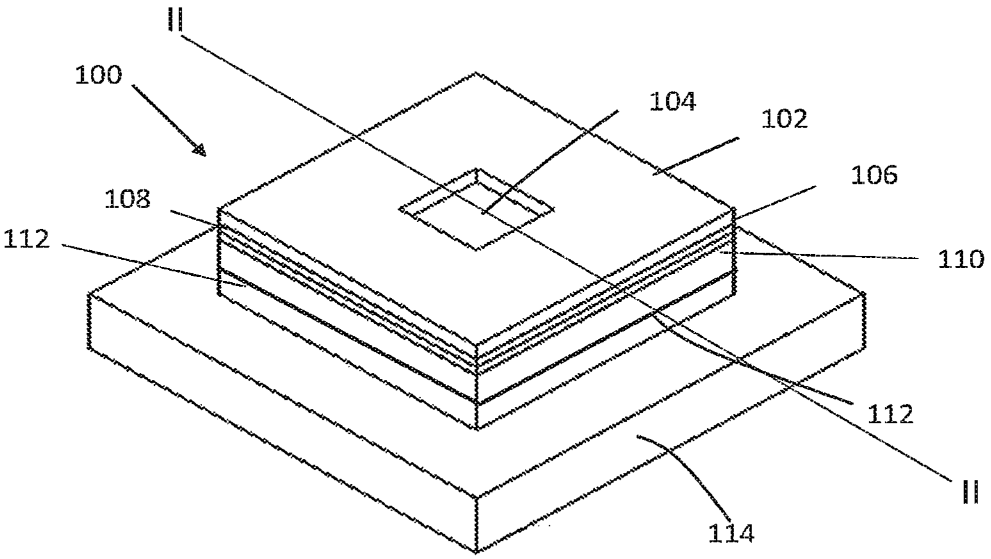
FIG. 1 is a simplified pictorial illustration of an X-ray target constructed and operative in accordance with a preferred embodiment of the present invention particularly useful for XPS and XRF measurement.
Figure 2:
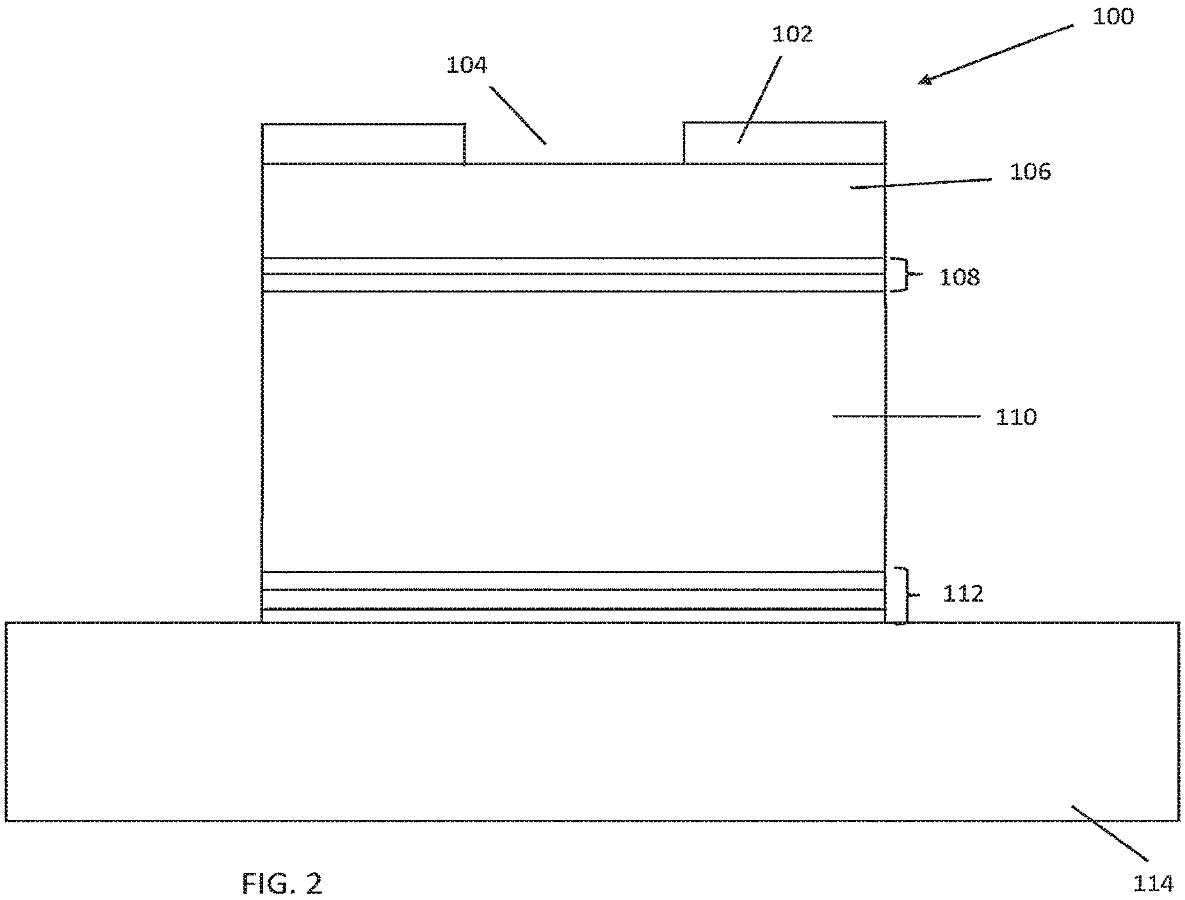
FIG. 2 is a simplified (not to scale) sectional illustration of the X-ray target of FIG. 1, taken along lines II-II in FIG. 1.

Reference is now made to FIGS. 1 and 2, which are respective simplified pictorial and sectional illustrations of a patterned X-ray target 100 constructed and operative in accordance with a preferred embodiment of the present invention.

The patterned X-ray target 100 preferably comprises a patterned X-ray impermeable mask 102, typically formed of gold and having one or more apertures (openings) 104, which define at least one X-ray passage window. Mask 102 is preferably formed of gold having a thickness of approximately 1 μm. It is appreciated that depending on the rate of desired blocking up, mask 102 could be thinner or thicker, such as a thickness of up to 2 μm.

Underlying mask 102 there is preferably provided an active layer 106, such as a layer of aluminum (Al), having a thickness of approximately 2 μm. Alternatively, the active layer 106 may be selected from tungsten (W), Tantalum (Ta), magnesium (Mg), or any other suitable material.

Underlying active layer 106 and bonded thereto, via a plurality of intermediate layers 108, is a diamond substrate 110. The plurality of intermediate layers 108 provide a graded transition between the pure metal of active layer 106 and the carbon diamond crystalline structure of diamond substrate 110. The intermediate layers 108 facilitate a transition between the two dissimilar materials, thus improving the bonding between the two materials. Reference is made to U.S. Pat. No. 7,359,487, the disclosure of which is hereby incorporated by reference, which describes various possible structures and compositions of intermediate layers 108.

Diamond substrate 110 is preferably of a thickness of 0.5 mm and underlies intermediate layers 108.

The properties of the diamond substrate 110 can be modified in a number of ways. In some circumstances, it may be desirable to dope the diamond with boron to increase the electrical conductivity (while also reducing thermal conductivity), for example, in order to dissipate the charge from an electron beam used to excite x-ray emission. In other circumstances, the thermal conductivity can be increased by optimizing impurities, grain size, grain boundaries or surface roughness of the diamond.

Underlying diamond substrate 110 and bonded thereto via an additional plurality of intermediate layers 112 is a heat-sink 114. The intermediate layers 112 may be selected from the group consisting of titanium, chromium, nickel, gold, silver, aluminum, copper, any alloy thereof, and any combination thereof.

Alternatively, the diamond substrate 110 may be bonded to the heat sink 114 by soldering, using one or more intermediate solder layers. The solder layer or layers may comprise a low melting temperature material that when heated to soldering temperatures would not cause undue oxidation of the ionizing radiation forming layer. Heat sink 114 preferably comprises a high thermal conductivity material; such as beryllium oxide (BeO), tungsten, silicon carbide, aluminum nitride, copper, aluminum, silver, cemented diamond (ScD) and any combination thereof.

Aperture(s) could be of any desired shape/dimension(s) e.g. spot-like or strip-like (straight, curved, etc.) and define any desired pattern (1D, 2D, periodic, random, etc.). In case of strip-like aperture (trench), mask might block beam of electrons and/or excited X-Rays along one axis (1D) only.

Figure 8:
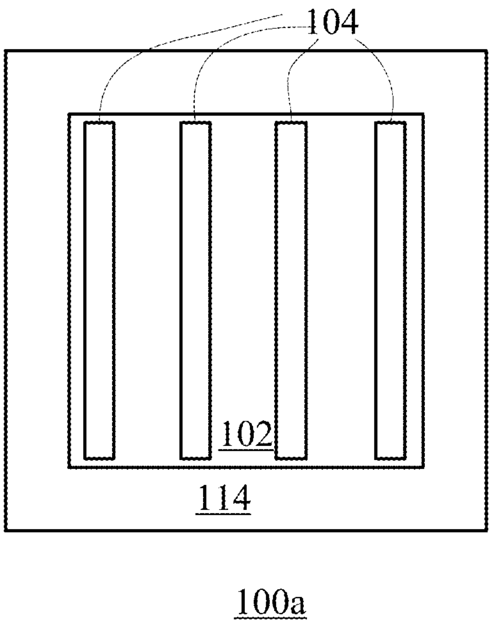
Figure 8:
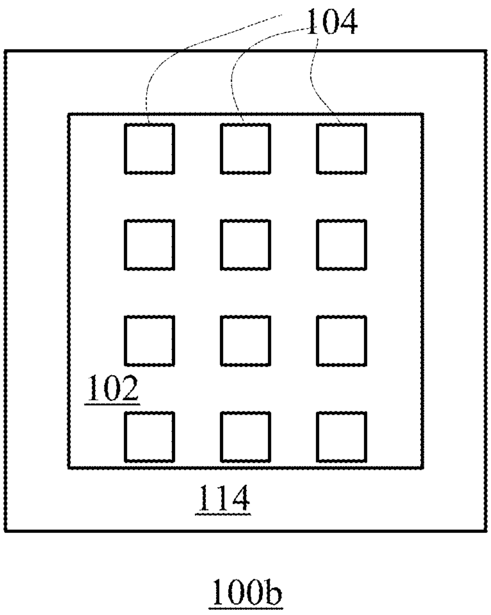

Such configuration could be useful e.g. in case grazing angles of X-Ray incidence or when further necessary shaping of X-Ray achieved by directing optics (slits, focusing elements, etc.). Patterned X-ray target 100 and/or beam of electrons could be moved continuously or step-like along one or two axes, e.g. along strip-like aperture. See for example patterned X-ray targets 100*a* and 100*b* of FIG. 8.

Figure 3:
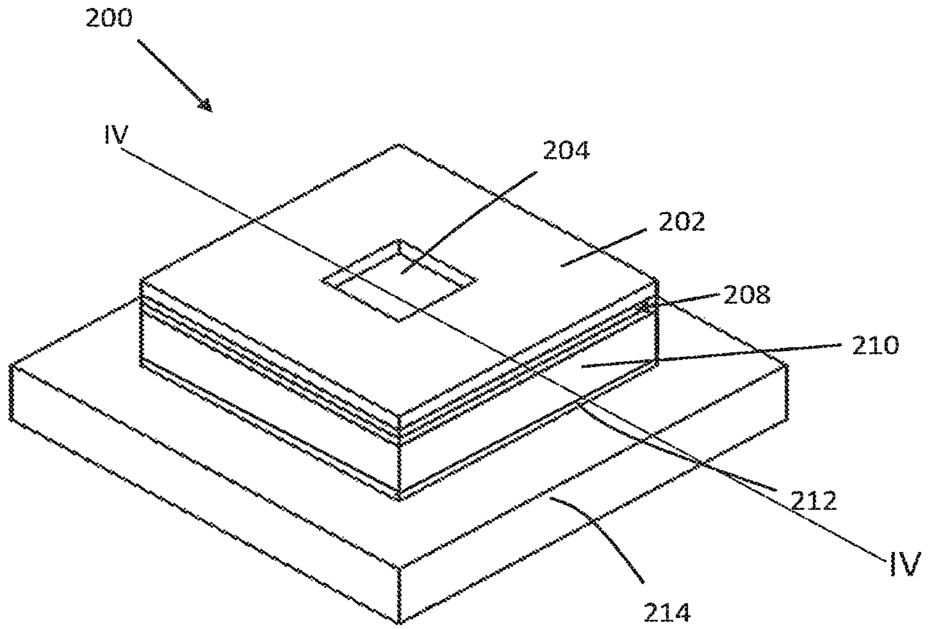
FIG. 3 is a simplified pictorial illustration of an X-ray target constructed and operative in accordance with another preferred embodiment of the present invention particularly useful for XRS and XRD measurement.
Figure 4:
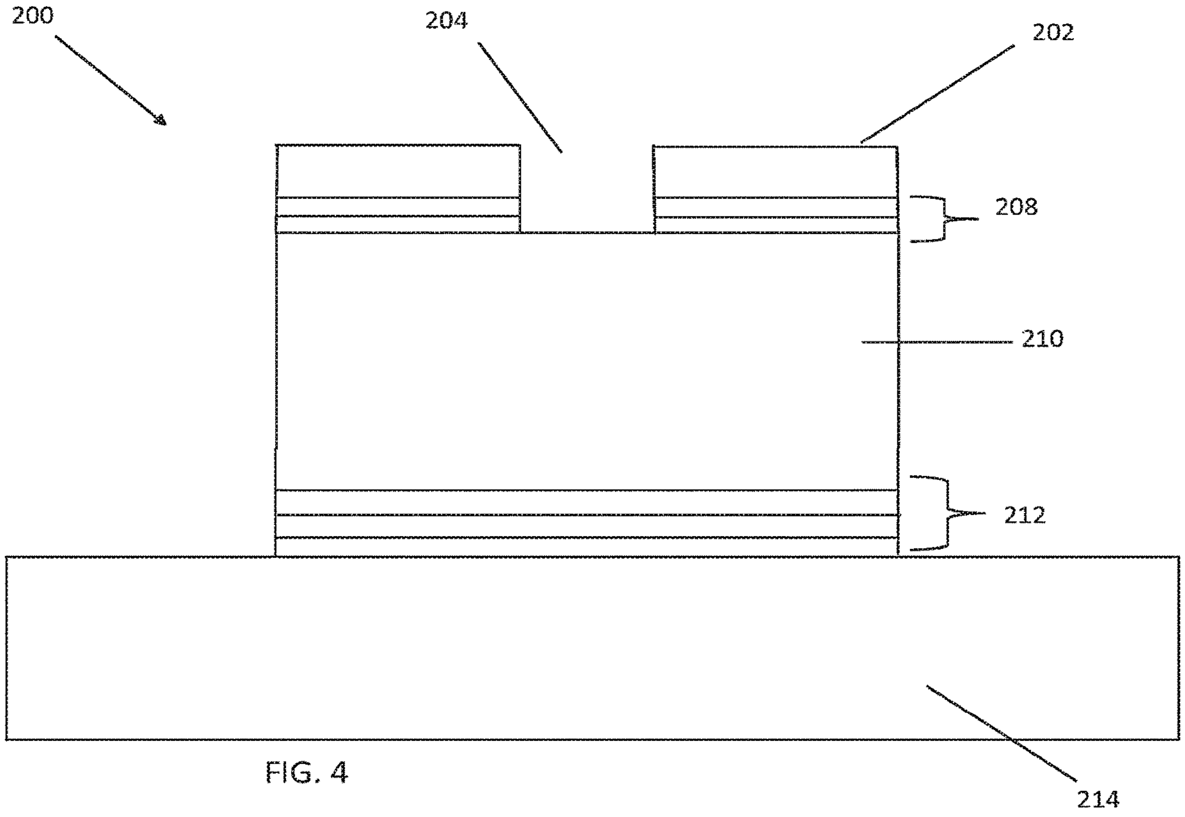
FIG. 4 is a simplified (not to scale) sectional illustration of the X-ray target of FIG. 3, taken along lines IV-IV in FIG. 3.

Reference is now made to FIGS. 3 and 4, which are respective simplified pictorial and sectional illustrations of a patterned X-ray target 200 constructed and operative in accordance with a preferred embodiment of the present invention.

The patterned X-ray target 200 preferably comprises a patterned X-ray impermeable mask 202, typically formed of gold and having one or more apertures (openings) 204, which define X-ray passage window(s). Mask 202 is preferably of a thickness in the range about 0.1 μm-0.2 μm. It is appreciated that mask 202 should not be too thick to avoid possible "geometrical" obstruction of some of the grazing angle exit photons.

Underlying mask 202 and bonded thereto, via a plurality of intermediate layers 208, is a diamond substrate 210, typically of thickness 0.5 mm. In this embodiment, the diamond substrate 210 functions as an active layer.

The properties of the diamond substrate 210 can be modified in a number of ways. In some circumstances, it may be desirable to dope the diamond with boron to increase the electrical conductivity (while also reducing thermal conductivity), for example, in order to dissipate the charge from an electron beam used to excite x-ray emission. In other circumstances, the thermal conductivity can be increased by optimizing impurities, grain size, grain boundaries or surface roughness of the diamond.

The plurality of intermediate layers 208 provide a graded transition between the carbon diamond crystalline structure of diamond substrate 210 and the pure metal of mask 202. The intermediate layers 208 facilitate a transition between the two dissimilar materials, thus improving the bonding between the two materials. Reference is made to U.S. Pat. No. 7,359,487, the disclosure of which is hereby incorporated by reference, which describes the structure of intermediate layers 208.

Underlying diamond substrate 210 and bonded thereto, via an additional plurality of intermediate layers 212, is a heatsink 214. The intermediate layers 212 may be selected from the group consisting of titanium, chromium, nickel, gold, silver, aluminum, copper, any alloy thereof, and any combination thereof.

Alternatively, the diamond substrate 210 may be bonded to the heat sink 214 by soldering, using one or more intermediate solder layers. The solder layer or layers may comprise a low melting temperature material that when heated to soldering temperatures would not cause undue oxidation of the ionizing radiation forming layer. Heat sink 214 preferably comprises a high thermal conductivity material; such as beryllium oxide (BeO), tungsten, silicon carbide, aluminum nitride, copper, aluminum, silver, cemented diamond (ScD) and any combination thereof.

Aperture(s) could be of any desired shape/dimension(s) e.g. spot-like or strip-like (straight, curved, etc.) and define any desired pattern (1D, 2D, periodic, random, etc.). In case of strip-like aperture (trench), mask might block beam of electrons and/or excited X-Ray along one axis (1D) only. Such configuration could be useful e.g. in case grazing angles of X-Ray incidence or when further necessary shaping of X-Ray achieved by directing optics (slit(s), edge(s), focusing elements, etc.).

As seen in FIG. 4, intermediate layers 208 are preferably apertured in registration with one or more apertures 204.

Figure 5:
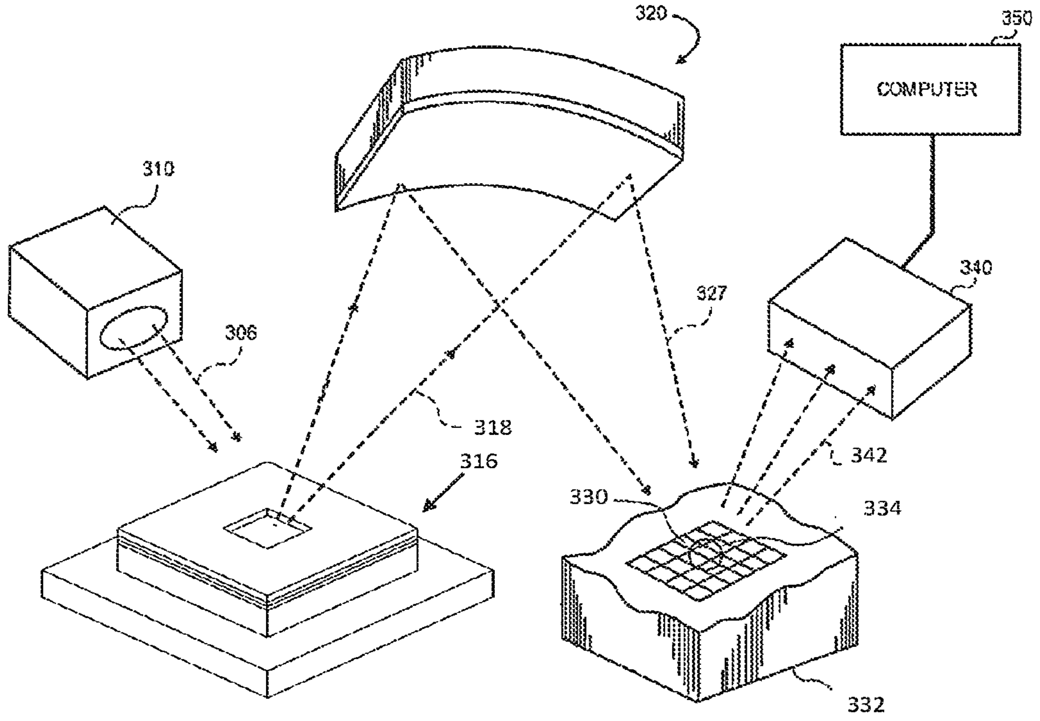
FIG. 5 is a simplified generalized illustration of an X-ray inspection system employing an X-ray target of an embodiment of the present invention.

Reference is now made to FIG. 5, which is a simplified generalized illustration of an X-ray inspection system employing a patterned X-ray target of an embodiment of the present invention.

As seen in FIG. 5, an electron beam 306 is provided by an electron beam gun 310. The electron beam 306 impinges upon the surface of an X-ray target 316, preferably an X-ray target of the type described above and shown in FIGS. 1-4, and thus produces ionizing radiation 318, preferably x-rays. The ionizing radiation 318 may be employed for any suitable purpose.

In the illustrated embodiment, the ionizing radiation 318 impinges on a monochromator 320, such as a Bragg crystal monochromator, and preferably ionizing radiation 327 reflected from monochromator 320 impinges upon a sample 330 located on a sample holder 332, and more specifically onto a targeted sample surface 334 to be examined. The reflected ionizing radiation 327, such as x-rays, may be reflected and thus scattered by impingement on the sample 330. Additionally or alternatively, such impingement may result in the production of photoelectrons. A suitable detector 340 detects the reflected radiation 342. In one embodiment, the data generated by the detector 340 is communicated to a computer 350 for further processing to generate useful information and/or images.

Figure 6:
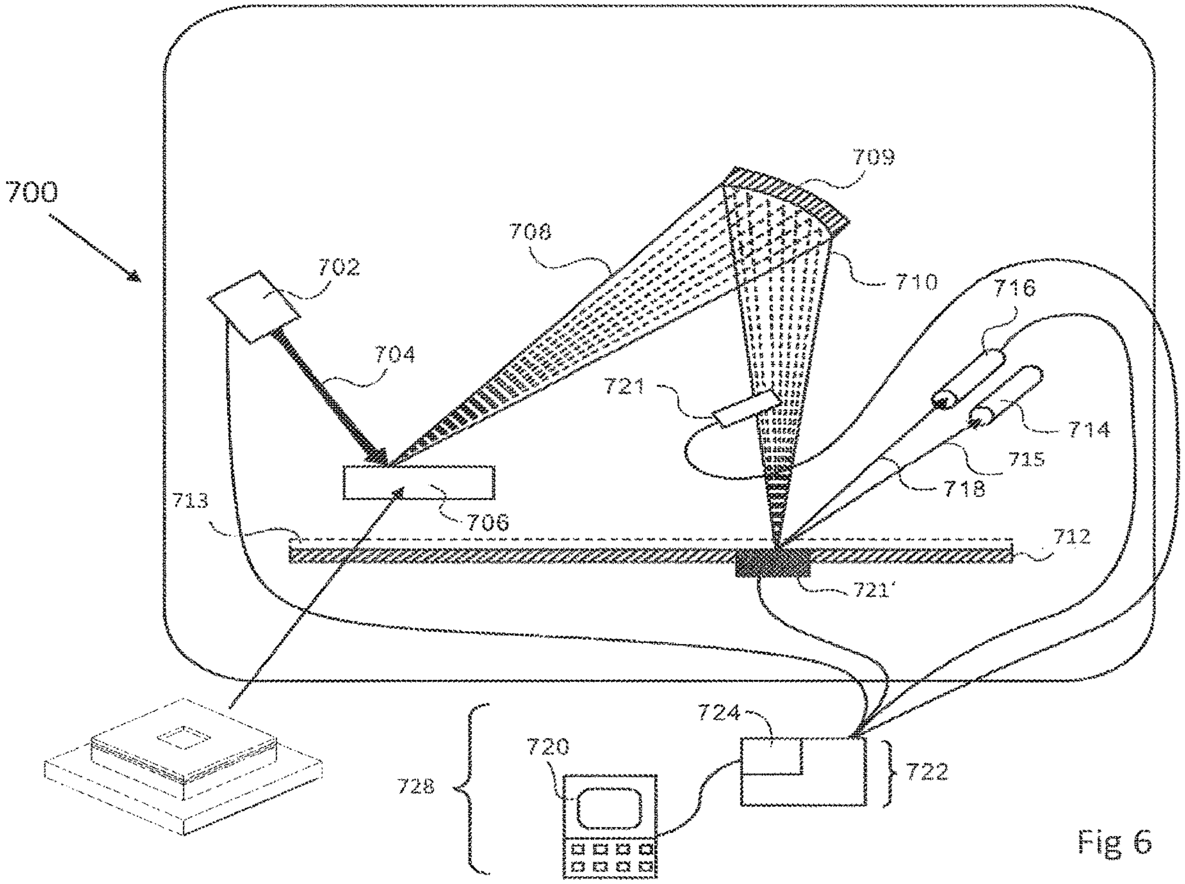
FIG. 6 is a simplified illustration of an XPS or XRF X-ray measurement system employing an X-ray target of an embodiment of the present invention.

Reference is now made to FIG. 6, which is a simplified illustration of an XPS or XRF X-ray measurement system 700 employing an X-ray target of an embodiment of the present invention.

As seen in FIG. 6, X-ray measurement system 700 includes an electron beam source 702, for generating an electron beam 704. Electron beam 704 bombards an X-ray target 706, preferably an X-ray target of the type described above and shown in FIGS. 1-4, and thereby generates an X-ray beam 708. A monochromator 709 receives X-ray beam 708 and produces a monochromatic X-ray beam 710. A sample holder 712 may be used to position a sample 713 in a pathway of monochromatic X-ray beam 710.

An XPS detector 714 may be provided for generating an XPS signal 715 resulting from bombardment of sample 714 with monochromatic X-ray beam 710. Alternatively or additionally, an XRF detector 716 may be provided for generating an XRF signal 718, also resulting from bombardment of sample 714 with monochromatic X-ray beam 710.

The XRF signal 718 and the XPS signal 715 may be detected simultaneously or nearly simultaneously, representing a single sampling event. The XPS signal 715 and XRF signal 718 result from detection of photo-electrons and fluorescent X-rays, respectively. Additionally, a flux detector 721' may be provided for determining an estimated flux of monochromatic X-ray beam 710. In one such embodiment, flux detector 721' is positioned at sample holder 712, as depicted in FIG. 6. In another embodiment, an X-ray flux detector 721 is placed near the monochromator 709 to partially intersect a small fraction of the primary X-rays in X-ray beam 708 in order to monitor the X-ray flux while the sample holder 712 is positioned at an analysis site.

A computing system 728 preferably includes a user interface 720, a computing engine 722 and a memory 724. Computing system 728 may be configured to process the XPS signal 715 output by XPS detector 714 and/or the XRF signal 718 output by XRF detector 716. Computing system 728 may also be configured to monitor the primary X-ray flux as measured by flux detector 721 or 721'. In accordance with an embodiment of the present invention, computing system 728 is operative for normalizing the XPS signal 715 detected by XPS detector 714, as well as an XRF signal 718 detected by XRF detector 716 in accordance with the X-ray flux measured by flux detector 721 or 721'.

Figure 7:
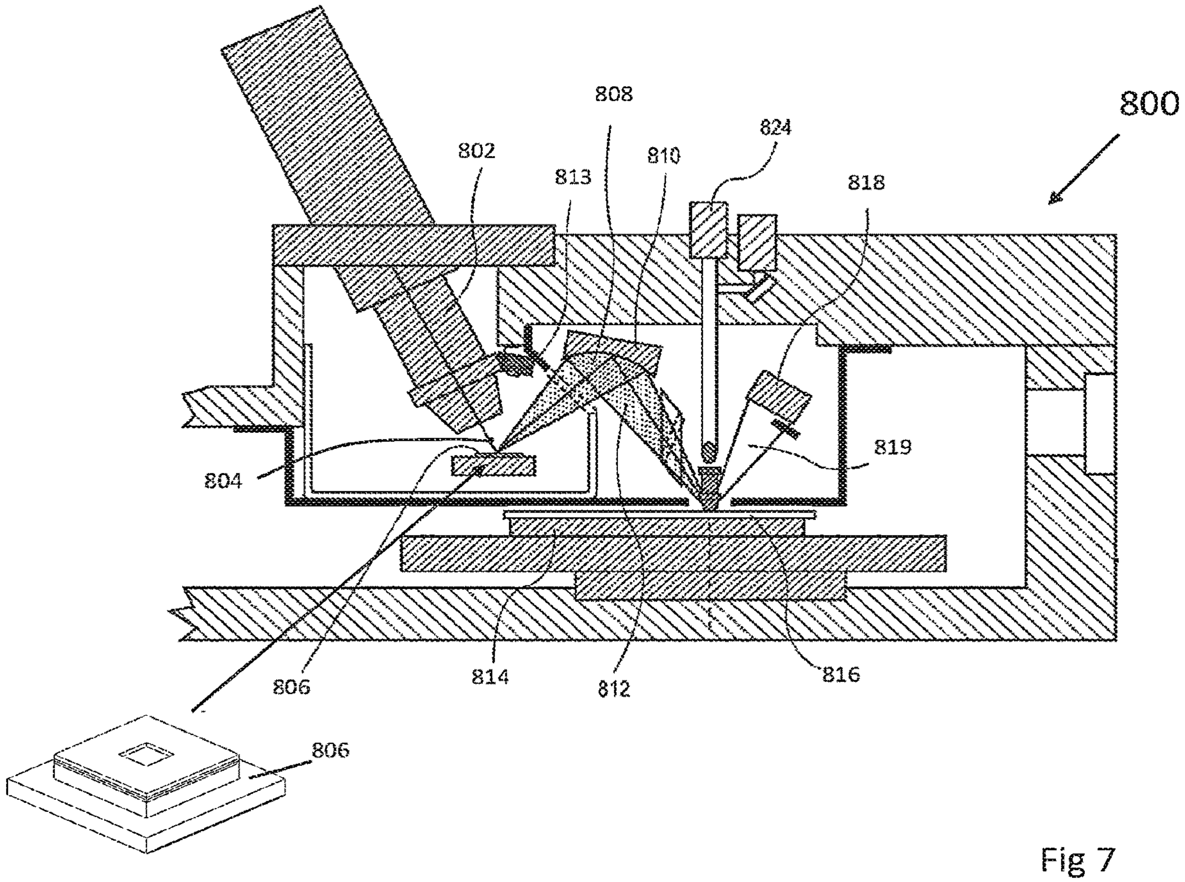
FIG. 7 is a simplified illustration of an XRS or XRD X-ray measurement system employing an X-ray target of an embodiment of the present invention, and FIG.8 illustrate example of multiple aperture masks.

Reference is now made to FIG. 7, which is a simplified illustration of an XRS and/or XRD X-ray measurement system 800 employing an X-ray target of an embodiment of the present invention and being operative for providing X-ray reflectance scatterometry.

As seen in FIG. 7, X-ray measurement system 800 includes an electron beam source 802, for generating an electron beam 804. Electron beam 804 bombards a X-ray target 806, preferably an X-ray target of the type described above and shown in FIGS. 1-4, and thereby generates an X-ray beam 808, preferably having an energy of approximately 1 keV or less. A monochromator 810 receives X-ray beam 808 and produces a monochromatic X-ray beam 812. A magnetic electron suppression device 813 is provided between the X-ray target 806 and the monochromator 810.

A sample holder 814 is preferably provided to position a sample 816, preferably having a periodic structure, in a pathway of monochromatic X-ray beam 812. The monochromator 810 is also operative for focusing the X-ray beam 808 to provide focused, monochromatic X-ray beam 812 to the sample holder 814. A detector 818 receives at least a portion of an X-ray beam 819 scattered from sample 816.

In the illustrated embodiment, the X-ray target 806 is designed for generating low energy X-rays and may include, in addition to the carbon in diamond substrate 212, molybdenum (Mo) or Rhodium (Rh) for higher energy XRF.

It will be appreciated by persons skilled in the art that the present invention is not limited to what has been particularly shown and described hereinabove. Rather the scope of the present invention includes both combinations and sub-combinations of various features described hereinabove as well as modifications and variations thereof which are not in the prior art.

We claim:

1. An X-ray source for generating an X-ray beam, said X-ray source including:

an electron gun that is configured to generate an electron beam; and a patterned X-ray emitting target that comprises:

an X-ray blocking mask that is made of gold, comprises one or more openings, and one or more structural elements positioned below the X-ray blocking mask and comprising an X-ray generating structural element;

the one or more structural elements comprise a top structural element; wherein the one or more openings pass through an entirety of the X-ray blocking mask and define one or more empty spaces that terminate at the top structural element;

wherein the X-ray generating structural element is configured to (a) receive electrons of the electron beam that pass through the X-ray blocking mask, and (b) reflect, through the X-ray blocking mask, the X-ray beam; and wherein the X-ray blocking mask is shaped and sized to prevent obstruction of grazing angle exit X-ray photons.

2. The X-ray source according to claim 1, wherein said electron gun is operative to provide an electron beam which has spatially varying intensity.

3. The X-ray source according to claim 1, wherein the X-ray generating structural element is an X-ray generating substrate; wherein the patterned X-ray emitting target also comprising at least one adhesion layer disposed between said X-ray generating substrate and said X-ray blocking mask.

4. The X-ray source according to claim 1, wherein the and one or more structural elements comprise a diamond substrate that is boron doped in a patterned manner to increase electrical conductivity for dissipating charge from the electron beam.

5. The X-ray source according to claim 1, wherein the X-ray generating structural element is selected out of an X-ray generating substrate or an X-ray emitting overlay formed on at least one surface of a thermal conductivity substrate.

6. The X-ray source according to claim 1, wherein the X-ray generating structural element is an X-ray emitting overlay formed on at least one surface of a thermal conductivity substrate, wherein the thermal conductivity substrate is made out of a thermal conductivity material selected out of beryllium oxide (BeO), tungsten, silicon carbide, aluminum nitride, copper, aluminum, silver, cemented diamond (ScD).

7. The X-ray source according to claim 1, wherein a thickness of the X-ray blocking mask ranges between one tenth and two tenths of a micron.

8. The X-ray source according to claim 1, wherein the top structural element is an active layer selected from aluminum, tungsten, tantalum, magnesium, or combinations thereof.

9. The X-ray source according to claim 1, wherein the one or more openings are configured as spot-like or strip-like openings arranged in a one-dimensional or two-dimensional pattern.

10. The X-ray source according to claim 1, wherein the one or more structural elements comprise a diamond substrate, and a heatsink bonded to the diamond substrate via intermediate layers of the X-ray generating structural element, wherein the intermediate layers are selected from the group consisting of titanium, chromium, nickel, gold, silver, aluminum, copper, any alloy thereof, and any combination thereof.

11. The X-ray source according to claim 1, wherein the X-ray generating structural element is an X-ray emitting overlay, wherein the patterned X-ray emitting target comprises at least one adhesion layer disposed between a diamond substrate of the X-ray generating structural element and said X-ray emitting overlay and between said X-ray emitting overlay and said X-ray blocking mask, wherein the at least one adhesion layer provides a graded transition between dissimilar materials to facilitate bonding.

12. An X-ray photoelectron spectroscopy (XPS) system comprising: an X-ray source for generating an X-ray beam; a sample holder positioning a sample; a monochromator positioned between said X-ray source and said sample holder such that said X-ray beam travels from said X-ray source to said monochromator and then to said sample holder; and a detector for collecting at least a portion of photo-electrons produced by said sample, wherein the X-ray source comprises an electron gun that is configured to generate an electron beam; and a patterned X-ray emitting target that comprises: an X-ray blocking mask that is made of gold, comprises one or more openings; one or more structural elements positioned below the X-ray blocking mask and comprising an X-ray generating structural element; the one or more structural elements comprise a top structural element; wherein the one or more openings pass through an entirety of the X-ray blocking mask and define one or more empty spaces that terminate at the top structural element; wherein the X-ray generating structural element is configured to (a) receive electrons of the electron beam that pass through the X-ray blocking mask, and (b) reflect, through the X-ray blocking mask, the X-ray beam; wherein the X-ray blocking mask is shaped and sized to prevent obstruction of grazing angle exit X-ray photons.

13. The XPS system according to claim 12, wherein a thickness of the X-ray blocking mask ranges between one tenth and two tenths of a micron.

14. The XPS system according to claim 12, said one or more openings are configured to direct the X-ray beam to the monochromator, wherein the monochromator receives the X-ray beam and produces a monochromatic X-ray beam that is directed to the sample holder.

15. The X-ray source according to claim 12, wherein the X-ray generating structural element is an X-ray emitting overlay, wherein the patterned X-ray emitting target comprises at least one adhesion layer disposed between a diamond substrate of the X-ray generating structural element and said X-ray emitting overlay and between said X-ray emitting overlay and said X-ray blocking mask, wherein the at least one adhesion layer provides a graded transition between dissimilar materials to facilitate bonding.

* * * * *